Jan. 25, 1927.
W. BENDER
WINDWHEEL
Filed April 27, 1926
1,615,675
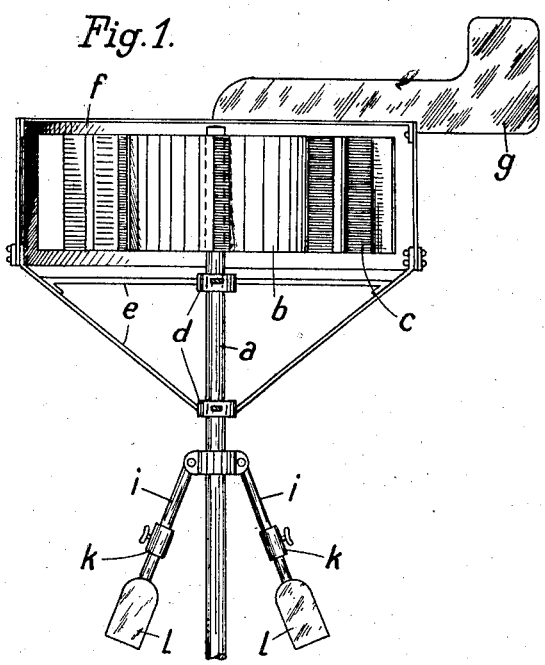
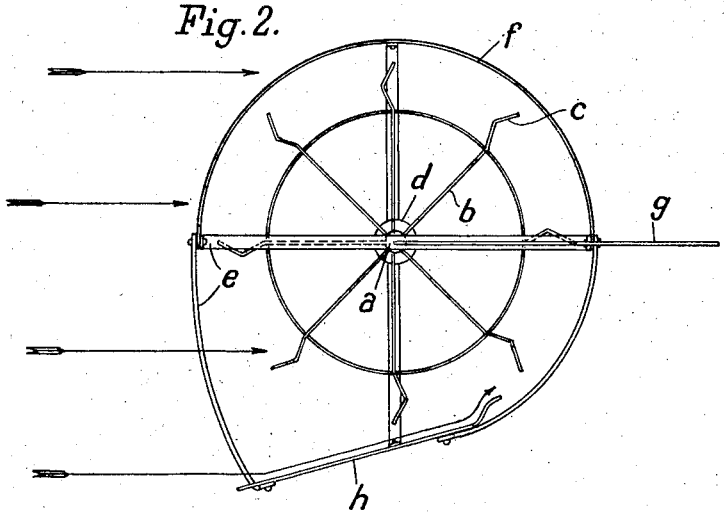
Inventor:
Walter Bender Patented Jan. 25, 1927.

1,615,675

UNITED STATES PATENT OFFICE.

WALTER BENDER, OF EMDEN, GERMANY.

WINDWHEEL.

Application filed April 27, 1926, Serial No. 104,920, and in Germany December 31, 1925.

This invention relates to a windwheel which differs from windwheels of known type in that it is horizontal with regard to the ground instead of vertical as usual.

In order that the wind wheel in this position presents to the wind a good surface of action the ends of the vanes are bent at an angle. A hood covers half of the windwheel and carries on the top a rudder, a guide screen being arranged at the side of the free vanes.

For regulating the shocks exerted upon the windwheel if the force of the wind varies a governor is mounted on said axle. The hinged arms of said governor have fan-shaped lower ends.

An embodiment of the invention is shown, by way of example, in the accompanying drawing in which—

Fig. 1 is a side elevation, the face for guiding the wind being omitted.

Fig. 2 is a plan view.

On the axle $a$ of the wind wheel, the fixation or connection of which with a pump or the like to be driven forms no part of the invention and is consequently not shown, the windwheel $b$ is keyed, the ends $c$ of the vanes being bent at convenient angles so that the wind acts in said angles. A system of rods $e$ is further mounted on the axle by means of ball bearings $d$ and carrying a hood $f$ which covers in any position one half of the windwheel. This hood $f$ has a steering rudder $g$. On the system of rods $e$ a screen $h$ is further fixed opposite the open side of said hood and extending in inclined direction towards the rudder $g$. Underneath the rods $e$ a governor is mounted on the axle $a$ the hinged arms $i$ of said governor carrying adjustable heavy masses $k$ adapted to be fixed. The ends $l$ of the arms $i$ are fan-shaped.

The direction of the wind is indicated by arrows.

The hood $f$ adjusts itself in accordance with the direction of the wind so that the air current can strike only against the ends $c$ of the vanes, which, viewed from the direction of the wind, are at the right side of the wind wheel axle. The air current is further positively guided upon said vane-ends by the screen $h$.

The governor is designed to maintain uniform the revolving speed of the axle if the force of the wind varies, as, if the revolving speed of the axle should increase at once if the wind blows stronger, the arms of the governor would have to be oscillated at a greater amplitude, the fan shaped ends $e$ opposing than a certain resistance which exerts a retarding action upon the revolving speed of the wheel axle.

I claim:—

A windwheel comprising in combination a vertical axle, vanes keyed on said axle and having the outer ends bent at convenient angles, a system of upwardly extending rods rotatably mounted on said axle, a hood fixed on said rods so that it adjusts its position in accordance with the direction of the wind and covers always the half of the vanes at one side of said axle viewed from the direction of the wind, a rudder on the top of said hood, a deflector fixed to said rods opposite the open side of said hood and extending in inclined position towards said rudder, and a governor on said axle underneath said rods and consisting of hinged arms, fan-shaped lower ends of said arms, heavy masses movably mounted on said arms, and means for fixing said heavy masses on said arms.

In testimony whereof I affix my signature.

WALTER BENDER.